United States Patent [19]

Thoma et al.

[11] Patent Number: 4,598,120

[45] Date of Patent: Jul. 1, 1986

[54] DISPERSION COMPOSITIONS, A PROCESS FOR THEIR PRODUCTION AND THEIR USE

[75] Inventors: Wilhelm Thoma; Rolf Langel; Walter Schröer, all of Leverkusen, Fed. Rep. of Germany

[73] Assignee: Bayer Aktiengellschaft, Leverkusen, Fed. Rep. of Germany

[21] Appl. No.: 724,140

[22] Filed: Apr. 17, 1985

[30] Foreign Application Priority Data

Apr. 28, 1984 [DE] Fed. Rep. of Germany ....... 3415920

[51] Int. Cl.$^4$ .............................................. C08K 3/20
[52] U.S. Cl. .................................. 524/591; 524/588; 524/837; 524/839; 524/861; 524/862
[58] Field of Search ............... 524/588, 591, 837, 839, 524/861, 862

[56] References Cited

U.S. PATENT DOCUMENTS 4,333,007  2/1984  Marwitz et al. .................. 427/54.1

*Primary Examiner*—Melvyn I. Marquis
*Attorney, Agent, or Firm*—Gene Harsh; Joseph C. Gil; Thomas W. Roy

[57] ABSTRACT

The present invention is directed to aqueous dispersion compositions in the form of aqueous, spreadable coating or printing pastes, characterized in that they contain (A) aqueous dispersions of polyurethanes (Aa) or mixtures of polyurethanes (Aa) and aqueous dispersions of poly(meth)acrylates (Ab), (B) carboxyl group-containing, aqueous thickener polymer solutions, (C) self-crosslinking polyorganosiloxane mixture and (D) crosslinking agents for the polyurethanes, for the carboxyl group-containing thickener polymers (B) and, optionally, for the poly(meth)acrylates.

The present invention is also directed to a process for the preparation of these aqueous dispersion compositions and to their use for coating or printing substrates.

11 Claims, No Drawings

DISPERSION COMPOSITIONS, A PROCESS FOR THEIR PRODUCTION AND THEIR USE

BACKGROUND OF THE INVENTION

1. Field of the Invention

This invention relates to a process for the production of aqueous dispersion compositions containing aqueous dispersions of polyurethanes and optionally poly(meth)acrylates, carboxyl group-containing, aqueous polymeric thickeners, self-crosslinkable polyorganosiloxanes and crosslinking agents.

The invention also relates to corresponding dispersion compositions and to their use for coating and for printing substrates to form hydrophobic coatings which are crosslinked after drying at elevated temperatures.

2. Description of the Prior Art

A variety of textile substrates are coated by direct coating with polyurethane solutions and dispersions which may be applied in several successive coats. Polyacrylate solutions and dispersions are also used for direct coating.

It is also known that polyacrylate dispersions may be blended with dispersions of silicones and that the resulting mixtures may be applied by direct coating.

According to DE No. 3,105,148 A 1(EP-A 1 58239), dispersions of copolymers of acrylates, ethylene, vinyl acetate and/or other monomers in admixture with silicones of the Si-vinyl/SiH-type may also be applied by direct coating using specified adhesive compounds and PT catalysts for crosslinking.

The use of coating compositions such as these and mixtures thereof involves several disadvantages. On account of their relatively high solubility in organic solvents, polyacrylates and copolymers thereof adversely affect the dry-cleanability of the textile substrates coated therewith. The emulsifiers present in the polyacrylate dispersions or dispersions of the copolymers also have an adverse effect (because of their hydrophilicity) in that they greatly reduce the hydrophobicity and resistance to washing of the coated articles.

Another disadvantage is the use of aqueous silicone dispersions because particularly hydrophilic emulsifiers are thus introduced into the coating mixture.

SUMMARY OF THE INVENTION

The present invention is directed to aqueous dispersion compositions in the form of aqueous, spreadable coating or printing pastes, characterized in that they contain (A) aqueous dispersions of polyurethanes (Aa) or mixtures of polyurethanes (Aa) and aqueous dispersions of poly(meth)acrylates (Ab),
(B) carboxyl group-containing, aqueous thickener polymer solutions,
(C) self-crosslinking polyorganosiloxane mixtures and
(D) crosslinking agents for the polyurethanes, for the carboxyl group-containing thickener polymers (B) and, optionally, for the poly(meth)acrylates.

The dispersion compositions according to the invention are obtainable by a process of mixing (A) aqueous dispersions of polyurethanes (Aa) or mixtures of (Aa) and aqueous dispersions of poly(meth)acrylates (Ab) with
(B) carboxyl group-containing, aqueous polymeric thickeners and subsequently adding
(C) self-crosslinkable polyorganosiloxanes which have not been previously dispersed in water, and wherein the composition also contains
(D) crosslinking agents for components (A) and (B).

The invention also relates to the use of the dispersion compositions according to the invention for coating and for printing substrates, particularly for coating and printing textiles or artificial leather substrates in small quantities to form crosslinked, relatively hydrophobic coatings after drying.

DETAILED DESCRIPTION OF THE INVENTION

The pastes according to the invention for coating textile substrates and the articles thus coated have the following advantages over the prior art. The self-crosslinkable polyorganosiloxanes (C) (which are also often called silicones or polysiloxanes) are incorporated in the dispersions, thickened with (B) without being dispersed beforehand in water, i.e. without the use of emulsifiers (which would result in the undesirable hydrophilicity of the coatings).

The polyurethane component of the coating paste increases the resistance of the coating to the swelling effect of organic solvents, i.e. it increases the resistance of the coated articles to dry cleaning. The hydrophilic properties of the carboxyl group-containing aqueous polymers (B), used as thickener for the PUR and poly(meth)acrylate dispersions (A), are greatly reduced through their crosslinking by (D), improving the resistance of the coated articles to washing. The hydrophobic, soft, washable and dry-cleanable coatings crosslinked in accordance with the invention may be formed by direct coating even in minimal layer thicknesses or with minimal spreads on the substrates.

It is preferred to use purely aqueous, solvent-free pastes for coating, including crosslinking.

PUR dispersions (Aa), produced in known manner, are used for the spreading pastes according to the invention. Processes for the production of stable aqueous polyurethane dispersions suitable for use in accordance with the invention, are described, for example, in DE-AS No. 1,178,586 (U.S. Pat. No. 3,756,992), DE-OS No. 2,314,512 (U.S. Pat. No. 3,905,929), DE-OS No. 2,314,513 (U.S. Pat. No. 3,920,598), DE-OS No. 2,320,719 (GB-PS No. 1,465,572), DE-OS No. 2,446,440, DE-OS No. 2,555,534 and DE-OS No. 2,811,148 and by D. Dieterich in "Angewandte Chemie" 82, 53/1970. The starting materials and production processes mentioned there and also in other state-of-the-art publications on PU-dispersion production may be used here.

The poly(meth)acrylate dispersions (Ab) optionally used in the production of the spreading pastes are also produced by known methods. They include the following components: (meth)acrylic acid esters with $C_1$-$C_{18}$-alcohols such as ethyl acrylate, butyl acrylate, methyl methacrylate, stearyl acrylate, acrylonitrile, acrylamide, N-methylol acrylamide, N-methoxymethyl acrylamide, acrylic acid, itaconic acid and their ammonium or alkali salts.

The ratio of polyurethane solids to poly(meth)acrylate solids in the mixtures of polyurethane dispersions (Aa) and poly(meth)acrylate dispersions (Ab) is between about 100:0 and 100:150, preferably between about 100:10 and 100:80.

The silicones (or polyorganosiloxanes) (C) are preferably self-crosslinking, addition-crosslinking silicone mixtures in which silicone compounds containing SiH groups are added onto silicon compounds containing Si-vinyl groups, preferably in the presence of platinum metal catalysts. Addition-crosslinking silicon mixtures are such as these are described, for example, in DE-OS No. 1,668,159, U.S. Pat. No. 3,159,601 and as components 1–3 in EP-A No. 1-58239.

Suitable components include in particular, (W) vinyl-group-containing polydimethyl siloxanes having a molecular weight of about 10,000 to 25,000, preferably containing about 0.2 to 10% by weight of vinyl groups which are mostly vinyl-endgroups, (X) Si-H-group-containing polydimethyl siloxanes having molecular weights of about 1000 to 20,000, preferably having an SiH-content of about 0.1 to 8% by weight, for example, trimethylsiloxy-methylhydrogensiloxy poly-dimethyl siloxanes.

(Y) optionally a low molecular weight, cyclic methyl siloxane compound containing vinyl groups, for example, cyclic methyl vinyl tetrasiloxane and (Z) a platinum catalyst, particularly platinum-siloxane complexes, of the type obtained by reacting platinum compounds such as platinum halides with vinyl siloxane compounds, preferably of the W type, and used in particular in the form of a solution of the platinum complex in (W) or (X).

The quantitative ratios in which components W, X, Y and Z are used amounts to about (80–95):(5–15):(0-.1–0.5):(0.01–0.2). The ratio of polyurethane-(Aa)-(and optionally poly(meth)acrylate-(Ab))-solids to silicone (C) from (W+X+Y+Z) amounts to between about 100:5 and 100:200, preferably between about 100:10 and 100:150.

As compounds (W) the well known polyorganosiloxanes with Si-C-bonded vinylgroups, preferably vinyl endgroups, can be used as they are, for example, described in EP-A No. 1 58239, pages 3 to 5, as component (1).

As compounds (X), the well known organopolysiloxanes, which contain SiH-groups can be reacted, as they are described as component (2) in EP-A 1 No. 58239, pages 5 and 6.

An extensive list of the well known Pt-catalysts (Z) to be used, is found, e.g. in EP-A No. 1 58239, pages 6 to 7 (described as component 3).

As component Y the methyl vinyltetrasiloxane

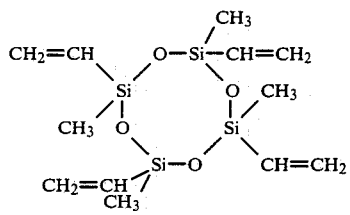

is a preferred component.

Carboxyl group-containing polymers in aqueous solution of the type normally used as thickeners are used as thickener (B) for the dispersions (A) (polyurethanes (Aa) or the mixtures of polyurethane and poly(meth)acrylate dispersions). The aqueous solutions have a concentration of about 2 to 25%. Examples of suitable carboxyl group-containing polymers of the type in question are poly(meth)acrylic acids, carboxy methyl celluloses, above all their alkali metal and ammonium salts, including organic ammonium salts with, for example, triethylamine or triethanolamine or N-methyl morpholine. The aqueous thickener solutions are used in a quantity of about 1 to 10% by weight, preferably about 3 to 5% by weight, based on the sum of the aqueous dispersions (A).

Urea-formaldehyde and melamine-formaldehyde resins, polyaziridines and polyepoxides, for example, are used as crosslinking agents (D) for the polyurethanes and, optionally, the poly(meth)acrylates present in the spreading pastes and, in particular, for the carboxyl group-containing, water-soluble polymers used for thickening.

Examples of suitable crosslinking agents are urea-methylol and melamine-methylol resins completely or partly, preferably predominately, etherified with methanol or butanols, of the type obtainable, for example, as melamine hexamethylol ethers or as formulated commercial products made and marketed by Hoechst AG under the name of Maprenal ®MF 900, 910, 915, 920, 927, 800, 650, 700 and 750, or as Cassurit HML; polyisocyanates reacted with ethylene imine or propylene imine, so-called aziridine ureas (Bayer, DE-PS No. 1,153,161); reaction products of acrylic acid esters of polyhydric alcohols and ethylene imine and/or propylene imine, for example, reaction products of trimethylol propane triacrylate with propylene imine; polyepoxides of diane and epichlorohydrin or polyalcohols and epichlorohydrin.

The crosslinking agents are used as solids or, in general, in the form of more than 50% solutions in quantities of about 0,5 to 10% by weight of solids, preferably 1 to 10% and preferably in quantities of about 2 to 5% by weight, based on the total weight of the aqueous dispersions (A).

The spreading pastes may contain in known manner pigments, dyes, fillers, light and hydrolysis stabilizers, antioxidants, flameproofing agents, antistatic agents, levelling aids, foam inhibitors, fungicides and bactericides, grip-improving agents and similar additives known per se.

The pastes may be applied by standard coating or printing techniques.

The spreads applied are preferably small, amounting to between about 5 and 25 g/m² preferably between about 8 and 15 g/m², based on solids. However, the pastes may also be applied in the usual larger quantities of about 25 to 60 g/m².

The drying and reaction temperatures are in the range of about 90° to 170° C., preferably about 110° to 160° C. High temperatures may also be briefly applied, depending on the residence time.

The invention is further illustrated, but is not intended to be limited by the foregoing examples in which all parts and percentages are by weight unless otherwise specified.

EXAMPLES

Example 1

(I) Production of a dispersion composition (spreadable coating paste) in accordance with the invention:

50 g of a 25% aqueous polyacrylic acid solution were added after 100 g of water and 3.0 g of a silicone-paste foam inhibitor to 500 g of a PUR dispersion P-1 and 500 g of a polyacrylate dispersion A 1 and the pH-value was subsequently adjusted to pH 8–9 using concentrated ammonia. The thickened dispersion mixture had a viscosity of 4000 mPa.s at 25° C. After the addition of 20 g of a 50% aqueous melamine resin solution, 226 g of a solvent-free silicone mixture having the following composition were incorporated with stirring into the viscous, aqueous preparation:

93.0% of vinyl dimethyl polysiloxanes with vinyl groups, essentially positioned as endgroups, as component (W)

6.85% of trimethylsiloxy-methyl hydrogen siloxygroups containing polydimethylsiloxane:

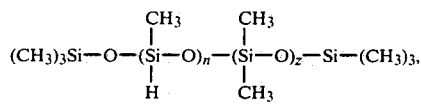

where n and z are numbers >2; as component (X)
0.15% of cyclic methyl vinyl tetrasiloxane, containing approximately 1% of platinum as platinum-O-complex.

(II) PUR dispersion P-1:

1700 g (1.0 mole) of a mixed polyester of 1,6-hexane diol, neopentyl glycol (molar ratio of glycols 65:35) and adipic acid were reacted with 303 g (1.8 moles) of hexane-1,6-diisocyanate to form an NCO-prepolymer which was chain extended in the aqueous phase with 152 g (0.8 mole) of sodium ethylene diamine ethyl sulfonate$^{(+)}$ to form the polyester urethane urea; solids content 40%.

$^{(+)}$formed from ethylene diamine and ethylene sulfone, as Na-salt.

(III) Polyacrylate dispersion A 1:

A 40% dispersion of a copolymer of 960 parts of butyl acrylate, 10 parts of itaconic acid, 25 parts of acrylamide and 5 parts of N-methylol acrylamide.

(IV) Direct coating by air knife 100 g/m$^2$ woven polyamide fabric was coated with paste (I) using an air knife. A 1 mm wide air knife blade was used; speed of travel 10 m/min., drying and reaction temperature 120°–150° C., spread (solids) 12 g/m$^2$.

The soft, low-friction coated article was then aftertreated with standard commercially available hydrophobizing agents. The article was distinguished by its very good resistance to washing and dry cleaning.

(V) Direct coating by rotary screen printing

A woven polyamide fabric of the same type as in (IV) was coated in a rotary screen printer (of the type manufactured by Stork, Boxmeer) using a 125-mesh screen. Speed of travel 120 m/min., tunnel temperature 150° C., spread 10 g/m$^2$.

EXAMPLE 2

(I) Paste preparation 900 g of a PUR dispersion P-1 according to Example 1/II and 100 g of a PUR dispersion according to DE No. 3,134,161 (Example 2) were mixed, 3.0 g of a silicone-based foam inhibitor were added to the resulting solution which was then thickened with 50 g of a 4% aqueous solution of sodium carboxy methyl cellulose. Following the addition of 25 g of a 50% aqueous melamine resin solution, 40 g of a solvent-free, self-crosslinkable silicone mixture were incorporated with stirring into the viscous aqueous preparation. The composition of the silicone mixture was the same as in Example 1.

(II) Direct coating by air knife.

120 g/m$^2$ polyester/cotton fabric was coated with paste (I) using an air knife. Speed of travel: 12 m/min. Drying and reaction temperature: 120°–150° C. Spread (solids): 8 g/m$^2$.

The very soft, supple article was then treated with standard commercially available hydrophobizing agents, for example with Perlit SE/Perlit Si/SW (products of Bayer AG, D-509 Leverkusen), from a solution containing approximately 20 g/l to 30 g/l of hydrophobizing agent.

The resistance of the article to dry cleaning was excellent and its resistance to washing was good.

EXAMPLE 3

(I) Paste preparation (A)

After the addition of 3 g of a silicone-based foam inhibitor, 600 g of a PUR dispersion P 2 and 400 g of a polyacrylate dispersion A 2 were thickened with 40 g of a 25% aqueous polyacrylic acid solution and adjusted with concentrated ammonia to pH 8–9. The thickened dispersion mixture had a viscosity of approximately 6000 mPa.s/25° C. After the addition of 30 g of a polyaziridine PA, 600 g of a solvent-free silicon mixture corresponding to Example 1 were stirred without preliminary dispersion into the viscous, aqueous preparation.

(II) PUR dispersion P 2

1680 g (0.84 mole) of a linear polypropylene glycol polyether (OH number 56), 2.15 g of dimethylol propionic acid (0.16 mole) and 16.0 g of triethylamine (0.016 mole) were reacted with 303 g of 1,6-hexane diisocyanate (1.80 moles) to form an NCO-prepolymer which was chain-extended in the aqueous phase with 30.0 g (0.5 mole) of ethylene diamine and 47.5 g (0.25 mole) of sodium ethylene diamine ethyl sulfonate to form the polyurethane urea; solids content 40%.

(III) Polyacrylate dispersion A 2

A 40% dispersion of a copolymer of 400 parts of butyl acrylate, 400 parts of ethyl acrylate, 175 parts of acrylonitrile, 10 parts of itaconic acid, 5 parts of N-methylol acrylamide and 10 parts of acrylamide.

(IV) Polyaziridine PA 296 g (1.0 mole) of trimethylol propane trisacrylate were reacted at 70° C. with 171 g (3.0 moles) of propylene imine (methyl aziridine) to form the trisaziridine.

(V) Direct coating

A 140 g/m$^2$ fabric of polyester/cotton blend was coated in the same way as in Example 1. Speed of travel: 8 m/min. Drying and reaction temperature: 120°–130° C. Spread (solids): 10 g/m$^2$.

The soft, full-bodied article was then finished with standard commercially available hydrophobizing agents. The coated article shows very good resistance to dry cleaning and washing.

(VI) Paste preparation (B)

Instead of a polyaziridine, 50 g of an epoxy resin (epoxide equivalent 120, viscosity 150 mPas) were incorporated as crosslinking agent in the spreading paste according to (A). Coating was carried out in the same way as in (V).

(VII) Comparison (without polyurethane dispersion)

Following the addition of 3 g of a silicone-based foam inhibitor, 1000 g of a polyacrylate dispersion A 2 were thickened with 40 g of a 25% aqueous polyacrylic acid solution and adjusted with Conc. ammonia to pH 8–9 in the same way as described in (I). The thickened dispersion mixture had a viscosity of approximately 5000 mPa.s at 25° C. After the addition of 30 g of a polyaziridine (PA), 600 g of solvent-free silicone mixture corresponding to Example 1 were stirred without preliminary dispersion into the viscous, aqueous preparation.

A polyester/rayon fabric was coated in the same way as described in (V). The full-bodied article was then finished with standard commercially available hydrophobizing agents. Although the coated article was washable, it showed very poor resistance to dry cleaning.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A dispersion composition in the form of an aqueous, spreadable coating or printing paste which comprises
   (A) an aqueous dispersion of a polyurethane (Aa) or a mixture of polyurethane (Aa) and an aqueous dispersion of a poly(meth)acrylate (Ab),
   (B) a carboxyl group-containing, aqueous thickener polymer solution,
   (C) a self-crosslinking polyorganosiloxane mixture which comprises a polysiloxane containing SiH-groups and a polysiloxane containing Si-vinyl groups and
   (D) a crosslinking agent for components (A) and (B).

2. The dispersion composition of claim 1 wherein component (C) is incorporated without preliminary dispersion in water optionally in solution, in a mixture comprising components (A) and (B).

3. The dispersion compositions of claim 1 wherein the ratio by weight of aqueous dispersion (A) to the self-crosslinking polorganosiloxane (C) is between about 100:5 and 100:200.

4. The dispersion composition of claim 1 wherein the polyurethane (Aa) is based on an aliphatic and/or cycloaliphatic polyisocyanate.

5. The dispersion composition of claim 1 wherein the self-crosslinking polyorganosiloxane (C) contains a relatively high molecular weight dimethyl polysiloxane containing vinyl groups, polydimethyl siloxanes containing SiH-groups, a Pt-complex as catalyst and optionally low molecular weight cyclic vinyl methyl siloxanes.

6. The dispersion composition of claim 2 wherein the self-crosslinking polysiloxane (C) contains a relatively high molecular weight dimethyl polysiloxane containing vinyl endgroups, polydimethyl siloxanes containing SiH-groups, a Pt-complex as catalyst and optionally low molecular weight cyclic vinyl methyl siloxanes.

7. The dispersion composition of claim 1 wherein said carboxyl group-containing, aqueous thickener polymer solution (B) is an aqueous solution comprising a member selected from the group consisting of poly(meth)acrylic acids, alkali salts of poly(meth)acrylic acids, ammonium salts of poly(meth)acrylic acids, carboxymethyl cellulose, alkali salts of carboxymethyl cellulose, ammonium salts of carboxymethyl cellulose and mixtures thereof.

8. The dispersion composition of claim 1 wherein said crosslinking agents is a formaldehyde resin, a polyaziridine and/or a polyepoxide.

9. A process for the production of an aqueous dispersion composition which comprises mixing
   (A) an aqueous dispersion of a polyurethane (Aa) or a mixture of (Aa) and an aqueous dispersion of a poly(meth)acrylate (Ab) with
   (B) a carboxyl group-containing aqueous thickener polymer solution and subsequently adding
   (C) a self-crosslinkable polyorganosiloxane mixture which comprises polysiloxanes having SiH-groups and polysiloxanes having Si-vinyl groups which has not been previously dispersed in water wherein said aqueous dispersion composition additionally contains
   (D) a crosslinking agent for components (A) and (B).

10. A process for preparing a coated substrate which comprises coating a substrate with the aqueous dispersion composition of claim 1 and subsequently curing the coating at elevated temperature.

11. The process of claim 10 wherein said substrate is a textile or artificial leather substrate.

* * * * *